(12) United States Patent
Tiberghien et al.

(10) Patent No.: US 9,863,566 B2
(45) Date of Patent: Jan. 9, 2018

(54) BAYONET COUPLING FOR THE DISCONNECTABLE CONNECTION OF PIPELINES

(71) Applicant: STAUBLI FAVERGES, Faverges (FR)

(72) Inventors: Alain-Christophe Tiberghien, Sevrier (FR); Christophe Durieux, Gilly sur Isere (FR); Igor Bahno, Ugine (FR)

(73) Assignee: STAUBLI FAVERGES, Faverges (FR)

( * ) Notice: Subject to any disclaimer, the term of this patent is extended or adjusted under 35 U.S.C. 154(b) by 359 days.

(21) Appl. No.: 14/608,933

(22) Filed: Jan. 29, 2015

(65) Prior Publication Data
US 2015/0233509 A1   Aug. 20, 2015

(30) Foreign Application Priority Data

Feb. 17, 2014   (FR) ...................................... 14 51250

(51) Int. Cl.
*F16L 37/32*   (2006.01)
*F16L 37/086*  (2006.01)
(Continued)

(52) U.S. Cl.
CPC ............. *F16L 37/086* (2013.01); *F16L 21/08* (2013.01); *F16L 37/113* (2013.01); *F16L 37/23* (2013.01);
(Continued)

(58) Field of Classification Search
CPC ....... F16L 37/086; F16L 37/113; F16L 37/23; F16L 37/36; F16L 55/07; F16L 37/34;
(Continued)

(56) References Cited

U.S. PATENT DOCUMENTS

| 69,706 A | * | 10/1867 | Roberts | ................. F16L 37/248 285/377 |
| 1,871,370 A | * | 8/1932 | Jacques | ................. F16L 37/248 285/267 |

(Continued)

FOREIGN PATENT DOCUMENTS

| DE | 9007363 U1 | 6/1991 |
| EP | 2141402 A1 | 1/2010 |
| FR | 1241277 A1 | 9/1960 |

OTHER PUBLICATIONS

The French Search Report for French Application 1451250 dated Oct. 8, 2014.

*Primary Examiner* — Craig J Price
(74) *Attorney, Agent, or Firm* — Dowell & Dowell, PC (57) ABSTRACT

A coupling for the connection of pipelines and includes a coupling element and a complementary coupling element that can fit into one another wherein the coupling element includes a first body, a locking ring mounted around the first body, the first body being secured in translation with the locking ring, and wherein the locking ring includes a slot to receive a radially protruding part of the complementary element, a locking notch in which the protruding part can be axially locked and wherein a lever is radially rotatable in the slot and an elastic element urges the lever toward a locking position in which the lever locks the protruding part in the notch. The coupling also has a single sealing gasket mounted on an outer surface of the first body to cooperate with the complementary element.

18 Claims, 9 Drawing Sheets

(51) Int. Cl.
  *F16L 21/08* (2006.01)
  *F16L 37/23* (2006.01)
  *F16L 55/07* (2006.01)
  *F16L 37/113* (2006.01)
  *F16L 37/36* (2006.01)

(52) U.S. Cl.
  CPC ............... *F16L 37/36* (2013.01); *F16L 55/07* (2013.01); *Y10T 137/87925* (2015.04); *Y10T 137/87933* (2015.04); *Y10T 137/87949* (2015.04); *Y10T 137/87957* (2015.04); *Y10T 137/87965* (2015.04)

(58) Field of Classification Search
  CPC ....... F16L 37/53; F16L 37/098; F16L 37/107; F16L 37/133; F16L 37/138; F16L 37/248; F16L 37/252; F16L 21/08
  USPC ...... 137/614–614.06, 798; 251/149.1, 149.3, 251/149.6, 149.7, 149.9
  See application file for complete search history.

(56) References Cited

U.S. PATENT DOCUMENTS

| | | | | |
|---|---|---|---|---|
| 1,885,321 A | * | 11/1932 | Benn | F16L 37/248 285/331 |
| 2,111,859 A | * | 3/1938 | Kennedy | F16L 37/252 285/110 |
| 5,370,527 A | * | 12/1994 | Hefling | F24C 5/18 126/38 |
| 5,954,370 A | * | 9/1999 | Pietersen | A47L 9/242 285/316 |
| 7,490,864 B2 | * | 2/2009 | Cheng | F16L 37/0847 137/614.05 |
| 7,731,243 B2 | * | 6/2010 | Tiberghien | F16L 37/107 285/316 |
| 7,766,393 B2 | * | 8/2010 | Tiberghien | F16L 37/0985 251/149.1 |
| 7,845,685 B2 | * | 12/2010 | Blivet | F16L 37/133 285/314 |
| 8,550,429 B2 | * | 10/2013 | Auston | F16L 37/096 251/149.1 |
| 9,115,838 B2 | * | 8/2015 | Konishi | F16L 37/23 |
| 2002/0011730 A1 | | 1/2002 | Stickan | |
| 2004/0150223 A1 | * | 8/2004 | Campau | F16L 37/138 285/308 |
| 2009/0322076 A1 | | 12/2009 | Tiberghien et al. | |
| 2013/0125377 A1 | * | 5/2013 | Nick | F16L 19/005 29/525.11 |

\* cited by examiner

BAYONET COUPLING FOR THE DISCONNECTABLE CONNECTION OF PIPELINES

BACKGROUND OF THE INVENTION

Field of the Invention

The present invention relates to a bayonet coupling for the disconnectable connection of pipelines.

BRIEF DESCRIPTION OF THE RELATED ART

EP-A-2,141,402 discloses a bayonet coupling comprising a female element designed to fittingly receive a male element. The female element comprises a body, an inner locking ring mounted around the body and an outer safety ring superimposed on the locking ring. The locking ring comprises notches provided to receive protruding locking pins positioned on the male element, so as to perform bayonet-type fastening. Two sealing gaskets are situated in the fluid tunnel, at respective valves of the male and female elements, which makes them difficult to access. A third sealing gasket is inaccessible because it is positioned in an inner slot of the body of the female element, and covered by the female valve when the coupling is in the uncoupled configuration.

This coupling is therefore not suitable for high-temperature and/or chemically active fluids, because the seals are then gradually deteriorated by the fluid and must be replaced frequently.

Furthermore, the safety ring has a complex geometry and is preferably made from a synthetic material making it possible to obtain elastic locking claws, which is not recommended for a temperature control application because the high temperatures of the fluid affect the mechanical characteristics of the claws.

The safety ring is mounted by the rear of the body of the female element, above the locking ring. Furthermore, the locking ring is in turn mounted around the body of the female element from the rear, which further limits the outer diameter of the rear end of the body and, for applications in which the female element must be connected to pipelines with a larger diameter, requires the addition of an intermediate part, and therefore the addition of extra sealing elements.

BRIEF SUMMARY OF THE INVENTION

The aim of the present invention is to propose a bayonet coupling for high-temperature fluids, in particular temperatures above 200° C., having simplified maintenance and including a locking ring with a simplified geometry in particular suitable for a temperature control application for injection press molds. Another aim of the invention is to propose a coupling element whereof the body can cooperate directly with a fluid pipeline with a relatively large diameter.

To that end, the invention relates to a coupling for the disconnectable connection of pipelines, comprising a coupling element and a complementary coupling element that can fit into one another along a longitudinal axis, the coupling element comprises:
 a first body,
 a locking ring mounted around the first body,
 means for securing the first body in translation with the locking ring.

The locking ring comprises:
 a slot able to receive a part radially protruding from a second body of the complementary element,
 a locking notch in which the protruding part can be axially locked along the longitudinal axis relative to the first body.

The coupling element comprises a lever able to be radially rotated in the slot between a locking position in which the lever locks the protruding part in the notch and a released position in which the lever allows the protruding part to pass between the notch and the slot, in that the elastic means can recall the lever toward the locking position.

The coupling element comprises a sealing gasket mounted in a housing arranged on an outer surface of the first body and the sealing gasket can radially cooperate with the second body in the coupled configuration.

Thanks to the coupling according to the invention, a single sealing gasket placed at the outer surface of the body is biased in coupling and uncoupling, which facilitates the coupling maneuvers and maintenance, since only the sealing gasket must be replaced and is accessible in the uncoupled configuration. Furthermore, the locking ring has a simplified geometry, since it does not include elastically deformable parts. Owing to the elastic means for returning the lever on the locking ring, it is not necessary to make the locking ring from a flexible material, which makes it possible to use the material to withstand high temperatures, such as steel.

According to other advantageous features of the coupling according to the invention, considered according to all technically allowable combinations:
 the coupling element and/or the complementary coupling element comprises a valve elastically loaded toward a seat formed in the body of the coupling element receiving that valve. In the uncoupled configuration, each valve is in direct sealed contact with the seat.
 The seal is arranged in an annular space, radially delimited between the first body and the locking ring, and the minimum radial thickness of the annular space in front of the seal is larger than the maximum radial dimension of the radial section of the seal.
 The securing means comprise at least one axial stop and one securing element, such as a bead, cooperating with a rear part of the locking ring. Over the length of a front part of the coupling element, delimited by the rear part of the locking ring and considered along the longitudinal axis, the maximum outer radial dimension of the first body is smaller than the minimum inner radial dimension of the rear part of the locking ring.
 A rear surface of the first body cooperating with the rear part of the locking ring has a diameter smaller than the minimum inner radial dimension of the rear part of the locking ring. A first distance, measured parallel to the longitudinal axis between the securing element and the bottom wall of the slots, is smaller than a second distance, measured parallel to the longitudinal axis between the rear part of the locking ring and the rear end of the rear surface.
 The securing means comprise a crown of beads positioned in an outer slot of the first body and radially covered by the locking ring.
 The outer surface of the first body comprises two outer stages, the diameters of which increase along the longitudinal axis, in a direction going from the front end toward the rear end of the first body, the inner surface of the second body comprises two inner stages respectively complementary to the two outer stages and the two outer stages cooperate with the inner stages in the coupled configuration of the coupling.

During coupling of the coupler, the two outer stages cooperate with the two inner stages before the seal cooperates radially and sealably with the second body.

The coupling comprises indexing means making it possible to position the locking ring and the second body relative to one another around a longitudinal axis in an indexed configuration which, during coupling of the coupler, takes place before contact between the protruding part and the lever.

When the protruding part is locked in a notch, a lateral surface of the protruding part can come into surface contact with a bottom wall of the notch.

When the protruding part is locked in the notch, a side surface of the protruding part can come into surface contact with the lever, the normal to the surface contact between the lateral surface of the protruding part and the lever is oriented in a direction parallel to the axis of rotation of the lever.

When the protruding part is locked in the notch, a rear end of the protruding part can come into surface contact with a front edge of the notch.

The notch extends in a circumferential direction relative to the longitudinal axis.

Each slot is oriented along the longitudinal axis, and for each slot, the locking notch comprises a first part and a second part extending on either side of the slot, the protruding element being able to be received in the first or second part of the notch.

The outer surface of the locking ring is provided with a tool cavity, in particular with six faces, arranged around a longitudinal axis.

BRIEF DESCRIPTION OF THE DRAWINGS

The invention will be better understood upon reading the following description, provided solely as a non-limiting example and done in reference to the appended drawings, in which.

DETAILED DESCRIPTION OF THE INVENTION

FIGS. 1 to 12 show a bayonet coupling 1, comprising a coupling element 4 configured as a female element, and a complementary coupling element 2 configured as a male element. Each element 2 and 4 is suitable for disconnectably connecting two pipelines and comprises a rear part respectively fluidly connected to a pipeline C1 or C2, shown in mixed lines only in FIG. 2. The two elements 2 and 4 are globally tubular and complementary to one another, such that they can fit together along a longitudinal axis X-X shared by those two elements.

The term "front" designates the parts of the elements 2 and 4 that are situated, along the longitudinal axis X-X, toward the other element 2 or 4 when the elements 2 and 4 are separated and the coupling 1 is about to be connected, as opposed to the parts of the elements described as "rear", which are situated, along the longitudinal axis X-X, on the side of the pipeline C1 or C2 connected to that element 2 or 4.

The terms "interior" or "inner" and "exterior" or "outer" refer to a fluid passage channel C in the coupled coupling 1. The "internal" or "inner" elements face the channel C and the "exterior" or "outer" elements face away from the channel C.

The term "radial" or "radially" refers to a direction perpendicular and secant to the longitudinal axis X-X.

The complementary coupling element 2 comprises a body 6, called second body, that is globally tubular and has a circular section that delimits the channel C. The body 6 comprises two locking pins 8, which each protrude radially outward relative to the body 6. The pins 8 extend on either side of two radial and diametrically opposite planes of symmetry D8 forming a 180° angle α between them in the illustration of FIG. 8.

Each pin 8 is globally in the shape of an annular portion centered on the axis X-X and laterally delimited, on each side, by first and second surfaces S81A and S81B that are not parallel to each other. The first surface S81A is a convex surface in the shape of a cylinder portion, the generatrix of which is oriented globally parallel to the plane D8, preferably at plus or minus 15° at most relative to a completely radial direction. The second surface S81B is planar and forms an obtuse angle β with a generatrix of the surface S81A, the angle β being situated on the side of the median zone of the pin 8 in the illustration of FIG. 8.

Figure 8:
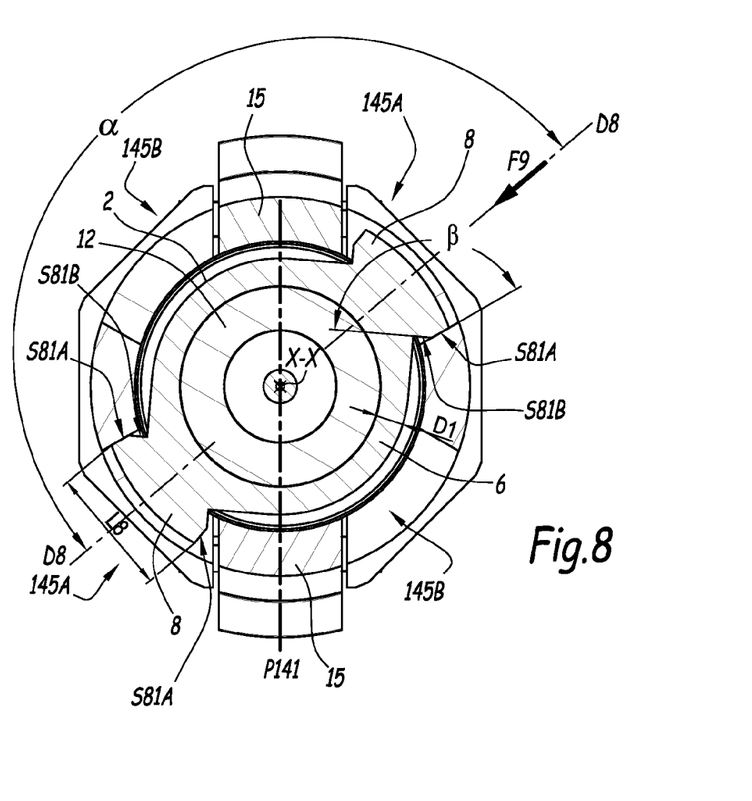
FIG. 8 is a larger scale cross-section along line VIII-VIII in FIG. 7, the support not being shown.

Reference L8 denotes the maximum width of each pin 8, measured between the first side surfaces S81A in a circumferential direction, i.e., an orthoradial direction relative to the longitudinal axis X-X.

The front and rear ends of each pin 8 are each delimited by a planar surface S82 globally in the shape of an annular portion, which is perpendicular to the longitudinal axis X-X.

The outer surface of the body 12 can radially cooperate with the body 6 in the coupled configuration of the coupling 1.

A valve 7 is mounted in the body 6 and is elastically loaded by a spring 9 toward the seat 61 formed by the body 6. The rear end of the spring 9 bears against a ring 10 mounted inside the body 6 and axially retained by a first metal elastic annulus 11 housed in a slot arranged inside the body 6.

When the valve 7 bears on the seat 61, the sealing between the valve 7 and the body 6 is provided solely by the direct sealed contact between the metal materials that make up the valve 7 and the body 6. In other words, in the sealing position, the entire contact zone between the body 6 and the valve 7 is formed by the metal surfaces of the body 6 and the valve 7. Thus, no attached sealing gasket is necessary to provide sealing between the valve 7 and the body 6. The contact zone is formed by a frustoconical surface of the seat 61 and a convex curved surface of the valve 7, with a complementary shape.

The coupling element 4 comprises a body 12, called first body, that is globally tubular and has a circular section that delimits the channel C. A locking ring 14 with a globally circular section, coaxial with the body 12 and centered on the longitudinal axis X-X, is housed around the body 12.

A second outer metal elastic annulus 17 is housed in a slot 124 arranged in an outer surface of the body 12 and forms an axial stop for the ring 14. A crown of several beads 18 is positioned around a longitudinal axis X-X in an outer slot 122 of the body 12, shown in FIG. 3 and situated on the side of a front end 12A of the body 12 relative to the slot 124. The beads 18 and the second elastic annulus 17 form means for securing the locking ring 14 in translation with the body 12.

The rear end 12B of the body 12 comprises an inner thread 127 provided to cooperate with an outer thread of the pipeline C2.

The locking ring 14 is axially secured to the body 12. A rear part 14B of the locking ring 14 is axially retained on the body 12 between the second elastic annulus 17 and the beads 18. Along the longitudinal axis X-X and in a first direction going from a rear end 12B of the body 12 toward its front end 12A, the rear part 14B of the locking ring 14 is retained by the beads 18. Along the longitudinal axis X-X and in an opposite direction going from the front end 12A of the body 12 toward its rear end 12B, the rear part 14B of the locking ring 14 is retained by the second elastic annulus 17.

The body 12 is equipped with an outer sealing gasket 19, i.e., mounted on the outside of the body 12, preferably made from elastomer, that is housed in an outer peripheral groove 126 of the body 12 near its front end 12A. The seal 19 is the only sealing element attached to the coupling 1. The coupling element 4 thus comprises a single attached sealing gasket, i.e., the seal 19, and the complementary coupling element 2 does not comprise any attached sealing element.

The body 12 of the coupling element 4 comprises an inner groove 128 that receives a third metal elastic annulus 20 housed inside the body 12, against which an inner ring 21 bears that serves as a stop for a spring 22 that exerts an elastic force on a valve 13 so as to press it against a seat 120 formed in the body 12.

Reference A4 denotes a front part of the coupling element 4, extending along the axis X-X between the front end 12A of the body 12 and the rear part 14B of the locking ring 14 axially secured on the body 12. The front part A4 delimits a front part of the body 12. Over the entire length of the front part A4, along the longitudinal axis X-X, the maximum radial outer dimension of the body 12 is smaller than the minimum radial inner dimension of the locking ring 14. In particular, this maximum outer radial dimension of the body 12 is smaller than the inner diameter D14 of the rear part 14B. Thus, over the entire length of the front part A4 of the coupling element 4, considered along the longitudinal axis X-X, the maximum outer radial dimension of the body 12 is smaller than the minimum inner radial dimension of the rear part 14B of the locking ring 14.

At the front part A4, the outer surface of the body 12 of the coupling element 4 comprises a front stage 121 and an intermediate stage 123 forming outer stages. The stages 121 and 123 are cylindrical outer surfaces with a circular section, connected to each other by a frustoconical surface S12. The diameter D121 of the front stage 121 is slightly smaller than the diameter D123 of the intermediate stage 123. The diameter of the stages 121 and 123 increases along the longitudinal axis X-X and in a direction going from the front end 12A of the body 12 toward its rear end 12B.

The inner radial surface of the body 6 of the complementary coupling element 2 comprises a front stage 62 and rear stage 63 that are two inner cylindrical surfaces with a circular section whose respective inner diameters D62 and D63 increase coming axially closer to the front end 6A of the body 6. The rear stage 63 has a larger diameter D63 than the front stage D62 and is axially closer to the front end 6A. The portions 62 and 63 are connected to each other by a frustoconical surface 65.

The inner diameter D62 of the front portion 62 is substantially equal to the diameter D123 of the rear portion 123. The inner diameter D63 of the rear portion 63 is substantially equal to the diameter D121 of the front portion 121. Thus, the stages 62 and 123 on the one hand, and the stages 63 and 121 on the other hand, are complementary.

The stage 123 of the body 12 is extended toward the rear end 12B by a rear surface 129, the diameter D129 of which is constant and strictly larger than the diameter D123 of the stage 123. The outer rear surface 129 houses the beads 18 and the elastic ring 17. The diameter D129 is strictly smaller than the inner diameter of the rear part 14B to allow the rear part 14B of the ring 14 to be placed around the rear surface 129. Alternatively, the diameter D129 is variable along the longitudinal axis X-X while remaining smaller than the inner diameter of the rear part 14B.

The rear surface 129 is limited toward the rear end 12B of the body 12 by a rear end 129B from which the body 12 has a radial dimension larger than the inner diameter of the rear part 14B.

The sealing between the body 12 and the valve 13 is done similarly to the sealing between the body 6 and the valve 7. When the valve 13 bears on the seat 120, the sealing between the valve 13 and the body 12 is provided solely by the direct sealed contact between the metal materials that make up the valve 13 and the body 12. In other words, in the sealed position, the entire contact zone between the body 12 and the valve 13 is formed by the metal surfaces of the body 12 and the valve 13. Thus, no attached sealing gasket is necessary to provide sealing between the valve 13 and the body 12. The contact zone is formed by a frustoconical surface of the seat 120 and a convex curved surface of the valve 13, with a complementary shape.

The locking ring 14 of the coupling element 4 is rotatable relative to the body 12 around a longitudinal axis X-X.

The locking ring 14 is provided with two longitudinal slots 141, regularly distributed around a longitudinal axis X-X so as to be able to simultaneously receive the two locking pins 8 of the additional coupling element 2. Each slot 141 emerges on the front of the locking ring 14, i.e., at its front face 14A.

Each slot 141 extends over the entire radial thickness of the locking ring 14, from a mouth 143 formed at the front face 14A. Each slot 141 ends, opposite the mouth 143, by a bottom wall 144 situated on the side of the rear part 14B of the locking ring 14 relative to the mouth 143. The slots 141 have a rectilinear shape and extend parallel to the longitudinal axis X-X.

Each slot 141 extends on either side of a median plane P141 passing through the axis X-X and extending in a radial direction. The plane P141 is a plane of symmetry for the slot 141.

Between the mouth 143 and the bottom wall 144, each slot 141 is extended in a direction oriented circumferentially, i.e., an orthoradial direction relative to the longitudinal axis X-X, by a locking notch 145 that comprises a first part 145A extending from a first side of the slot 141, and a second part 145B extending from the other side of the slot 141. The two parts 145A and 145B extend at the same level along the axis X-X and are situated on either side of the plane P141.

Each part 145A and 145B respectively comprises a mouth 146A or 146B that emerges in the slot 141, as well as a bottom wall 147A or 147B opposite the corresponding mouth 146A or 146B.

Two levers 15 are mounted articulated on the locking ring 14. Each lever 15 is provided to be partially received in one of the slots 141 of the locking ring 14, in the coupled and uncoupled configuration of the coupling 1.

Each lever 15 is globally in the shape of a toroid portion centered on the axis X-X, delimited by two parallel longitudinal edges. The longitudinal edges are parallel to a radial plane of symmetry of the lever 15 passing through the axis X-X. The width L15 of each lever, measured in a circumferential direction relative to the longitudinal axis X-X, is substantially equal, to within any functional play, to the width L141 of the slot 141 receiving that lever 15.

Each lever 15 is rotatably mounted on the locking ring 14, using a shaft 161 aligned on an axis X15 that is orthoradial relative to the longitudinal axis X-X, perpendicular to the planes of symmetry of the slot 141 and the lever 15. The shaft 161 extends along the axis X-X, between the rear part 14B of the locking ring 14 and the notch 145. The levers 15 are radially movable in the slots 141. The ends of the shafts 161 are housed in openings arranged in the locking ring 14. Thus, the levers 15 are rotatable relative to the ring 14, around axes X15 that are orthoradial relative to the longitudinal axis X-X. In a first direction of rotation tending to separate the front ends 15A of the levers 15 radially from the locking ring 14, the rotational movement of the levers 15 is limited by the bearing of the rear end 15B of the levers 15 against the locking ring 14. In the other direction, the rotation of the levers 15 is limited by shafts 162 serving as a stop for the lever 15. The shafts 162 are parallel to the shafts 161 and their ends are housed in holes arranged in the locking ring 14.

An elastic return means 23, such as a compression spring, is radially inserted between the locking ring 14 and the rear end of each lever 15, and exerts an elastic force that pushes the lever 15 back against the shaft 162 by default, in a locking position in which the lever 15 is housed inside the slots 141.

The outer peripheral groove 126 of the seal 19 is positioned at the front stage 121, near the front end 15A of the levers 15, more particularly along the axis X-X between the notches 145 and the front end 15A of the levers 15.

During the manufacture of the element 4, the element 4 is assembled by first mounting a single lever 15 on the locking ring 14, using a first shaft 161. A spring 23 is positioned radially between the rear end 15B of the lever 15 and the rear part 14B of the locking ring 14. The second shaft 162 is placed in the openings of the locking ring 14 provided to that end. Then, the locking ring 14 is mounted around the body 12, more specifically around the rear surface 129, by the front end 12A of the body 12, as far as a retracted position in which on the one hand the rear end of the rear part 14B is axially aligned with the rear end 129B of the rear surface 129, and on the other hand the rear part of the slot 141 provided with no lever 15 is axially aligned along a longitudinal axis X-X with the slot 122 designed to receive the beads 18. This retracted position makes it possible to insert beads 18 into the slot 122. In the configuration with the locking ring 14 secured on the body 12, a distance d1, measured parallel to the longitudinal axis X-X between the beads 18, at the rear end of the slot 122, and the bottom wall 144 of the slot 141, is smaller than a distance d2, measured parallel to the longitudinal axis X-X between the rear end of the rear part 14B and the rear end 129B of the rear surface 129, which makes it possible to insert beads 18 into the slot 122 through the slot 141 with the locking ring 14 in the retracted position for the assembly of the element 4.

Figure 4:
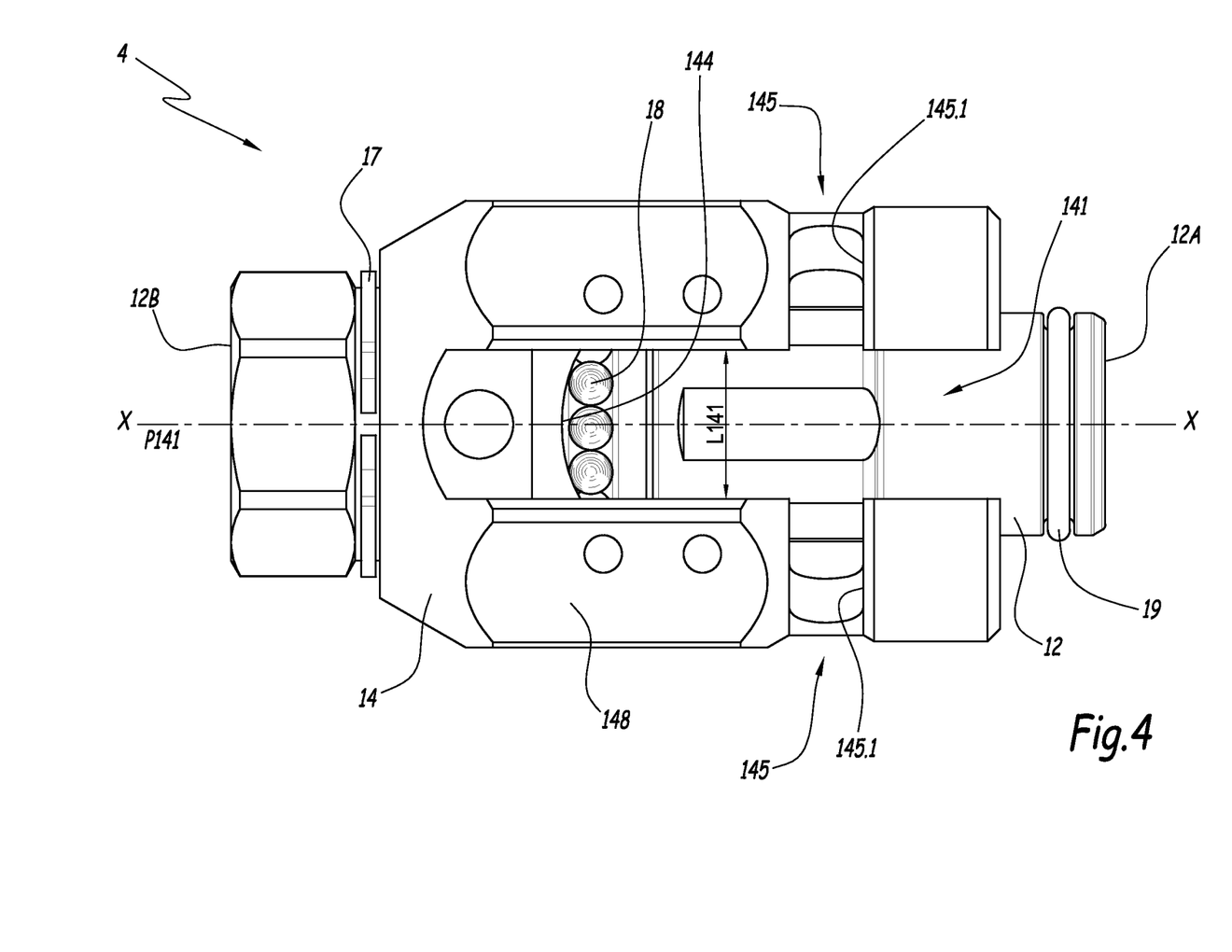
FIG. 4 is a top view of the coupling element during assembly.

Then, the beads 18 are introduced one by one into the slot 122 through the slot 141 with no lever 15. The slots 141 pass through the entire thickness of the locking ring 14, as shown in FIG. 4. The distance d2 forms a release of the locking ring 14 toward the rear end 12B of the body 12, at the rear surface 129, allowing the beads 18 to be inserted into the slot 141 with the locking ring 14 in the retracted position. In fact, the rear surface 129 is limited toward the rear end 12B of the body 12 by a portion 130 with a diameter larger than the diameter D129. In order to allow the beads 18 to be inserted, the diameter of the beads 18 is smaller than or equal to the width L141 of the slots 141, measured in a direction orthoradial to the longitudinal axis X-X. The diameter of the beads 18 corresponds to the maximum size of the beads 18.

Next, once the crown of beads 18 is placed in the slot 122, the locking ring 14 is advanced until the rear part 14B of the ring 14 comes into contact with the beads 18, which are then all radially covered by the ring 14. The rear part 14B of the locking ring 14 then cooperates with the rear surface 129 of the body 12. Then, the elastic ring 17 is placed in the slot 124 in order to axially immobilize the ring 14. Lastly, the second lever 15 is mounted on the locking ring 14, using the second shaft 161.

Figure 1:
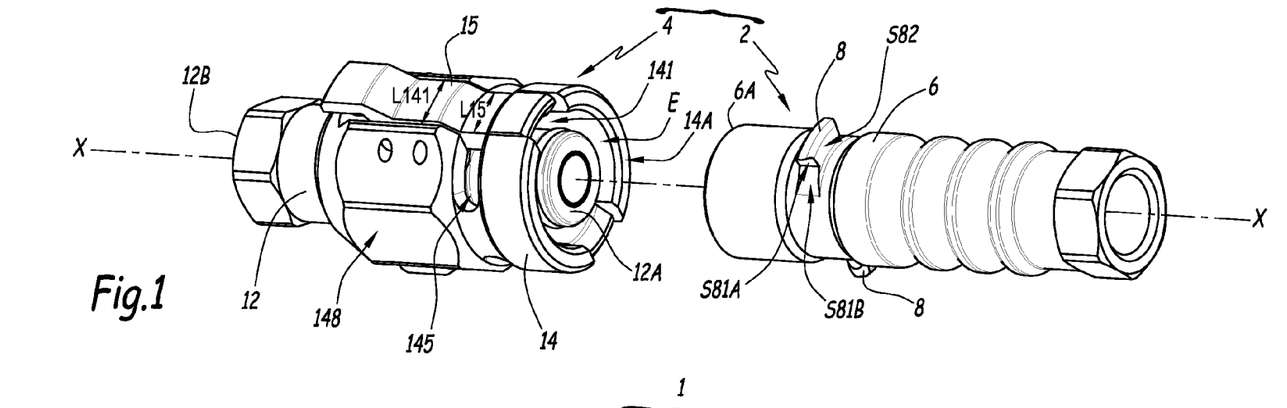
FIG. 1 is a perspective view of a coupling element and a complementary coupling element that are part of a bayonet coupling according to the present invention, in the uncoupled configuration.
Figure 2:
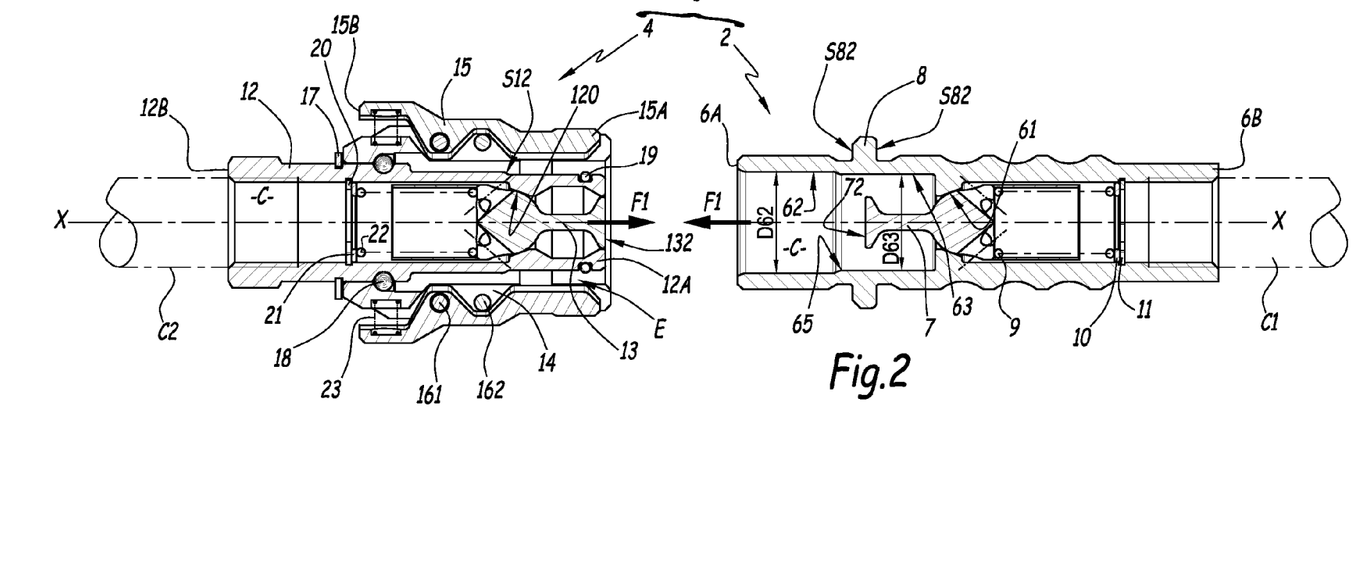
FIG. 2 is a longitudinal cross-section of the elements of the coupling of FIG. 1, in the uncoupled configuration.
Figure 3:
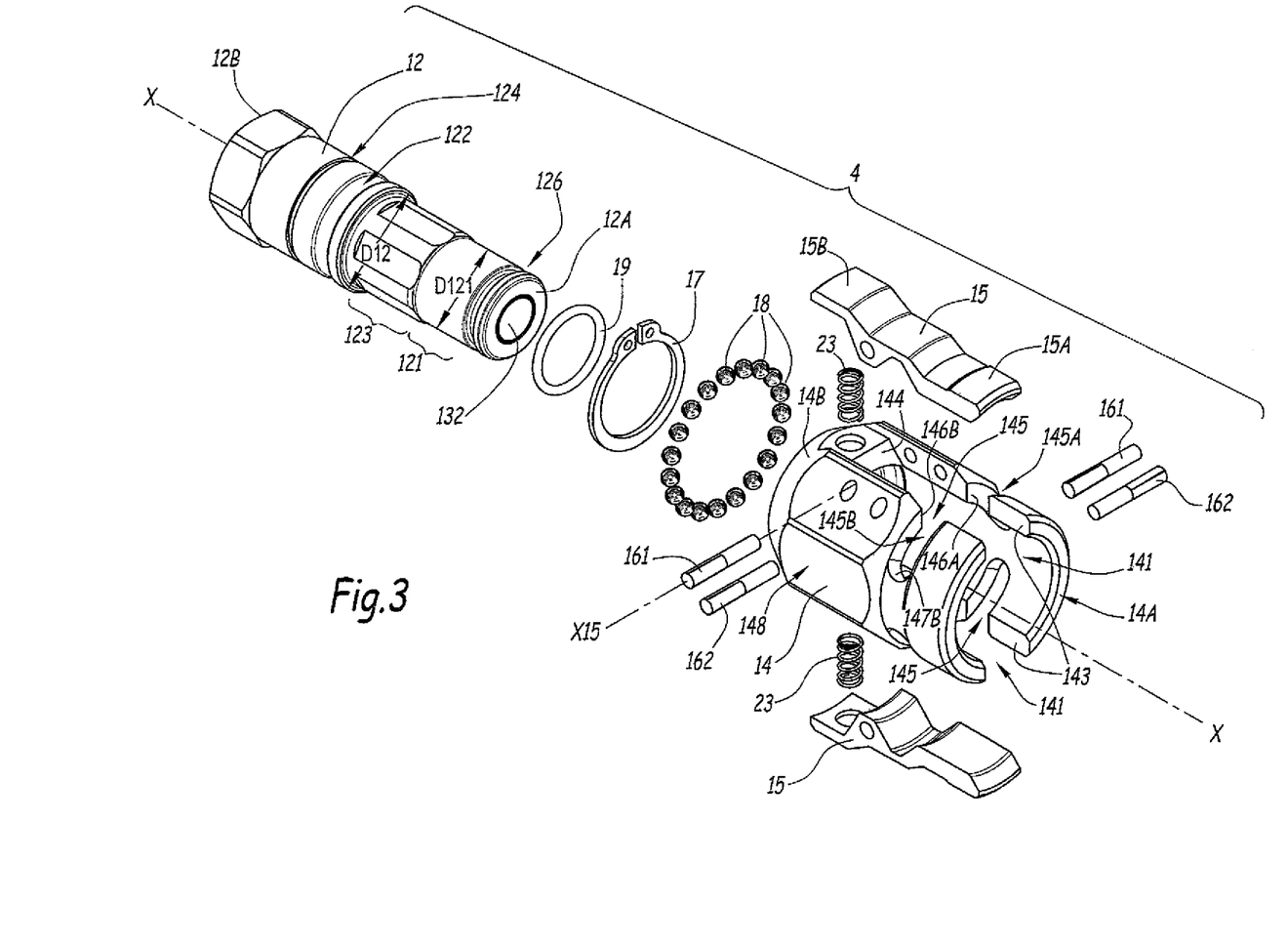
FIG. 3 is an exploded perspective view of the coupling element.

In the uncoupled configuration, the elements 2 and 4 are separated, as shown in FIGS. 1 and 2. To connect them, the user brings the two elements 2 and 4 closer together along the arrows F1, the orientation of which is parallel to the longitudinal axis X-X.

Figure 5:
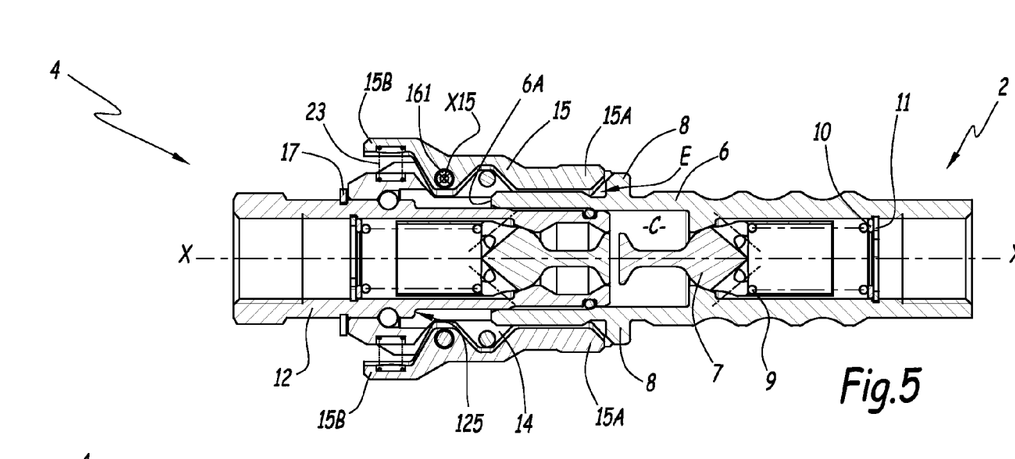
FIG. 5 is a longitudinal cross-section of the coupling in an indexed configuration of the coupling element with the complementary coupling element.

The coupling 1 is then brought into an indexed configuration, shown in FIG. 5, in which the front end 6A of the body 6 of the complementary coupling element 2 is inserted into the coupling element 4, in an annular space E radially delimited between the body 12 and the locking ring 14.

At the front part A4 of the coupling element 4, the maximum outer dimension D12 of the body 12 is strictly smaller than the minimum inner dimension D14 of the locking ring 14, so as to arrange the annular space E.

Reference D1 denotes a minimum thickness of the annular space E, measured radially in front of the seal 19, i.e., along the longitudinal axis X-X between the rear end of the groove 126 and the front end 12A of the body 12.

Along the longitudinal axis X-X, the seal 19 is situated retracted inside the annular space E relative to the front end 12A of the body 12 of the element 4.

Each locking pin 8 engages in one of the slots 141 of the locking ring 14, so as to produce angular indexing, around the longitudinal axis X-X, of the complementary coupling element 2 relative to the coupling element 4. The locking pins 8 and the slots 141 therefore form the indexing means around a longitudinal axis X-X of the body 6 relative to the locking ring 14. The width L141 of the slots 141 is substantially equal to the width L8 of the locking pins 8, so as to produce translational guidance of the complementary coupling element 2 relative to the locking ring 14. During the progression of the complementary element 2 in the element 4, this angular indexing occurs before the contact between the rear stage 63 of the body 6 of the complementary coupling element 2 and the seal 19 as well as before the contact of the pins 8 with the levers 15, as shown in FIG. 5.

During the coupling, the front stage 62 of the complementary element 2 cooperates with the front stage 121 of the element 4, with a significant radial play between the surfaces of those two stages. That radial play results from the difference in the diameters D62 and D121. Then, the front stage 62 engages around the rear stage 123 with a reduced radial play and the rear stage 63 engages around the front stage 121 with a reduced radial play, so as to provide double translational guiding of the complementary coupling element 2 in the coupling element 4. The dual guiding begins before contact of the pins 8 with the levers 15.

Figure 6:
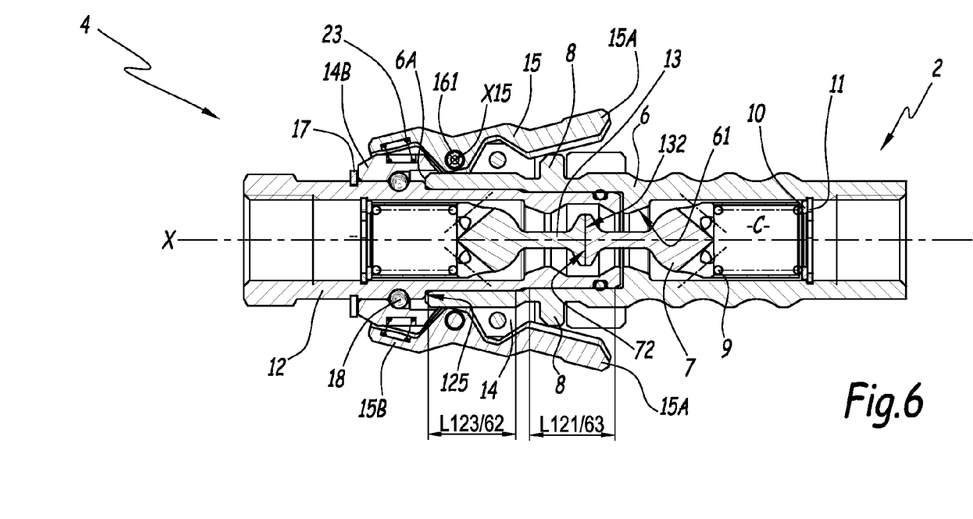
FIG. 6 is a cross-section of the coupler during coupling.

FIG. 6 shows a configuration during coupling, after the indexed configuration, in which the body 6 of the complementary element 2 has continued to progress in the element 4, such that the pins 8 have advanced toward the bottom wall 144 of the slots 141. The levers 15 are lifted by the pins 8, owing to a sliding contact between the pins 8 and the parts of the levers 15 previously engaged in the slots 141. The levers 15 are lifted against the elastic forces exerted by the springs 23 in a released position, in which the levers 15 allow the pins 8 to pass between the parts 145A and 145B of the notch 145 and the slot 141.

The front end 6A of the body 6 of the complementary element 2 abuts against an outer shoulder 125 formed in the body 12 of the coupling element 4.

A planar front face 72 of the valve 7 of the complementary coupling element 2 comes into contact with a planar front face 132 of the valve 13 of the coupling element 4. The valves 7 and 13 are pushed back outside their seat 61 or 120, against the return forces of the springs 9 and 22. The fluid is then allowed to flow in the channel C between the elements 2 and 4.

In order to lock the coupling 1, it is necessary to perform a rotational movement of the locking ring 14 relative to the body 6 of the complementary coupling element 2, in order to bring the pins 8 into one of the parts 145A or 145B of the locking notches 145. When the complementary element 2 is connected to the pipeline C1 beforehand, the pins 8 can be brought indifferently into the part 145A or 145B of the notches 145. The pins 8 are all brought into the part 145A of the notches 145, or alternatively all brought into the part 145B of the notches 145, depending on the direction of the rotational movement.

The pins 8 are then angularly offset relative to the levers 15, which are elastically returned to the locking position by the springs 23. In the locking position, the levers 15 lock the pins 8 in the notches 145 and prevent the pins 8 from leaving the notches 145 toward the slots 141, owing to the surface bearing of the two side surfaces S81B of the pins 8 against a longitudinal edge of the levers 15. The coupling 1 is then in a locked configuration, in which the pins 8 are axially locked relative to the body 12 in the notches 145. In other words, the locking ring 14 blocks the withdrawal of the complementary element 2 outside the element 4.

Figure 7:
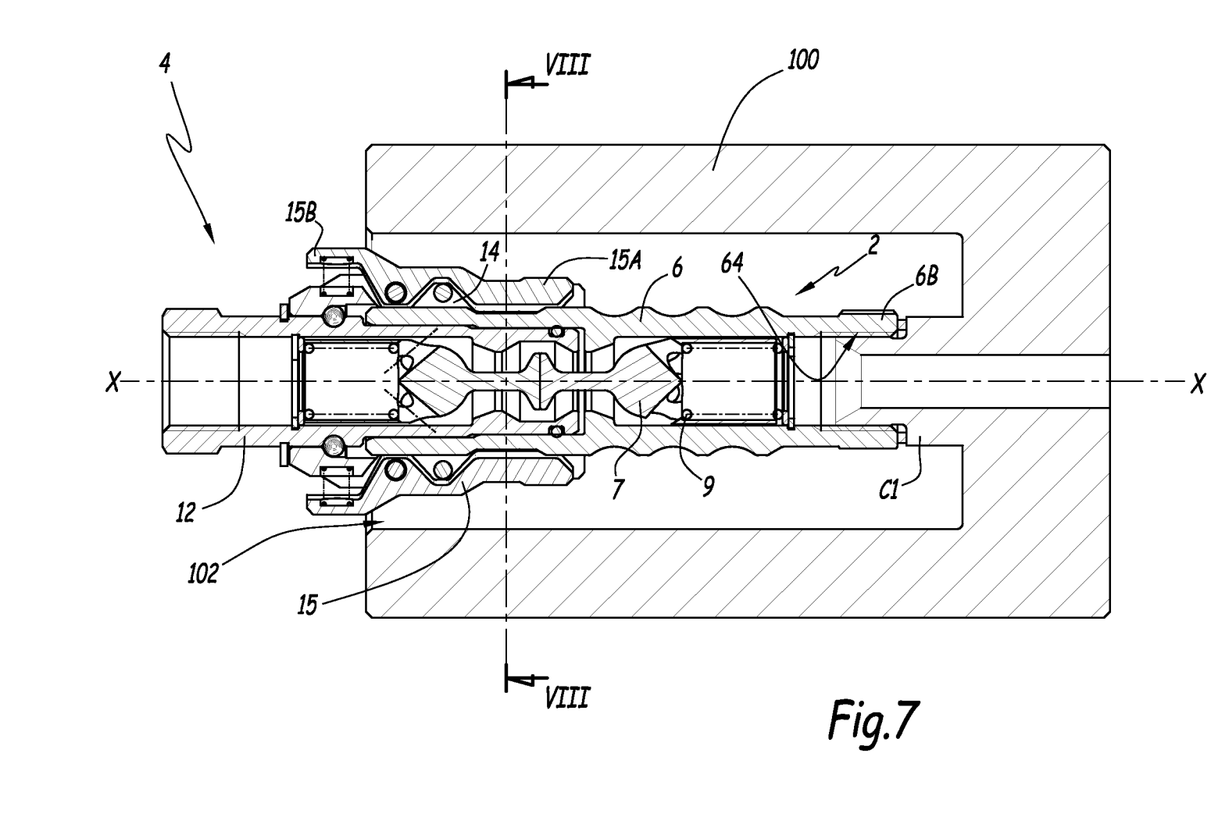
FIG. 7 is a longitudinal cross-section of the coupling in the locked configuration, the complementary coupling element being screwed on a support.

FIG. 7 shows the coupling 1 and a support 100 of the pipeline C1. In FIG. 7, the pipeline C1 is not shown, for clarity of the drawing. The coupling 1 is in a coupled and locked configuration, in which the fluid can pass in the channel C between the elements 2 and 4. The rear end 6B of the body 6 of the complementary element 2 is provided with an inner thread 64 that cooperates sealably with an outer thread of the channel C1. In the configuration of FIG. 7, the element 2 is sealably screwed on the pipeline C1 prior to coupling of the elements 2 and 4. During locking, the operator rotates the locking ring 14 relative to the complementary element 2 in order to place the pins 8 in one of the two parts 145A or 145B of the notches 145, indifferently.

In the event the complementary coupling element 2 is not screwed to the support 100 before coupling of the elements 2 and 4, the coupling element 4 is used to screw the complementary element 2 on the support 100. To that end, when the front end 6A of the body 6 of the element 2 abuts against the shoulder 125 of the body 12 of the element 4, the locking pins 8 are engaged in a notch 145 while performing a rotational movement of the body 6 of the element 2 in the direction that corresponds to the screwing direction of the element 2 on the support 100. For instance, in the example of FIG. 8, the screw pitch is straight and the pins 8 are brought into the parts 145A of the notches 145.

In order to screw the element 2 on the support 100, the outer surface of the locking ring 14 is provided with a tool cavity 148, for example with six outer faces, provided to cooperate with a complementary tool such as a key, making it possible to transmit the screwing torque to the locking ring 14 and thus rotate the body 6 by means of the contact between the first surfaces S81A of the pins 8 and the bottom wall 147A of the notches 145A. This contact is a surface contact in order to provide a satisfactory transmission of the screwing torque, which may be high. The tool allows the element 2 to be screwed on the pipeline C1 in the event the support 100 forms a well 102 that surrounds the coupling 1 and makes the complementary element 2 inaccessible to bare hands. The tool cavity 148 protrudes axially from the well 102 when the complementary element 2 is completely screwed with the pipeline C1. In other words, the tool cavity 148 is positioned axially at least partially behind the outer shoulder 125, which makes it possible to reduce the radial dimensions of the well 102.

When the complementary element 2 is completely screwed on the pipeline C1, it is then possible to feed the pipeline C1 or C2 to the cause a fluid to flow in the channel C between the coupling element 4 and the complementary coupling element 2.

When the coupling is in the coupled configuration, the repulsion forces of the elements 2 and 4 created by the springs 22 and 9 are transmitted from the element 2 to the element 4 by the rear planar surfaces S82 of the pins 8, which are in contact in the longitudinal direction with the front edges 145.1 of the notches 145. This surface contact has an expansive area, which guarantees good transmission of the separating forces of the bodies 12 and 6. Furthermore, the levers 15 do not absorb these repulsion forces, which is favorable for the mechanical strength of the coupling 1.

In the locked configuration of the coupling 1, the levers 15 oppose the unlocking of the pins 8 outside the notches 145, for example in case of vibrations. The levers 15 extend over the entire depth of the notches 145, which makes it possible to obtain extensive surface contact between the second surfaces S81B of the pins 8 and the longitudinal edges of the lever 15, and secures the locking of the coupling 1. The normal to this surface contact is oriented in an orthoradial direction parallel to the axis X15. Alternatively, the normal forms an angle inclined at most by plus or minus 15° relative to that orthoradial direction. Thus, the forces of the pins 8 received in the notches 145A or 145B against the levers 15 in the locking position do not cause lifting of the levers 15 toward their position releasing the pins 8.

The outer radial surfaces of the stages 121 and 123 of the body 12 are complementary to the inner radial surfaces of the stages 62 and 63 of the inner surface of the body 6.

In a completely fitted configuration of the elements 2 and 4, the stage 121 with the smaller diameter of the element 4 is fitted at the stage 63 with the smaller diameter of the complementary element 2, and the stage 121 covers the stage 63 over a covering length L121/63. Likewise, in this configuration, the stage 123 with a larger diameter 123 of the element 4 is fitted at the stage 62 with a smaller diameter of the complementary element 2, and the stage 123 covers the stage 62 over a covering length L123/62. During the coupling of the elements 2 and 4, the double guiding begins before there has been frank contact between the body 6, at the rear stage 63, and the entire periphery of the seal 19, i.e., before the seal 19 radially sealably cooperates with the body 6. The jamming of the body 12 in the body 6 is avoided and the guiding of the element 12 in the body 6 is favored.

In order to unlock the coupling 1, it is necessary for an operator to maneuver each lever 15 simultaneously by pressing on its rear end 15B against the return forces of the springs 23. The front ends 15A of the levers 15 are radially released outside the slots 141 at the axial level of the slots 145, and reach their released position, in which the levers 15 do not lock the pins 8 in the notches 145. The pins 8 can then leave the notches 145 when an operator performs a rotational movement of the body 6 of the complementary element 2 relative to the locking ring 14.

When each pin 8 leaves its notch 145, the propulsion forces generated by the valves 7 and 13, which are elastically loaded by the springs 9 and 22, drive the pins 8 toward the mouth 143 of the slots 141, which results in separating the elements 2 and 4 and returning the coupling 1 to the uncoupled configuration.

In order to unscrew the complementary element 2 from its pipeline C1, when the coupling 1 is in the coupled configuration and the pins 8 are locked in the notches 145, the operator closes the supply of fluid beforehand to interrupt the flow of fluid in the channel C, between the pipelines C1 and C2.

An operator makes a tool cooperate with the cavity 148 of the locking ring 14, and rotates the ring 14 in the direction corresponding to the unscrewing of the complementary element 2 from the support 100. The surface contact between the pins 8 and the levers 15 transmits that torque to the body 6 of the complementary element 2, which results in unscrewing the element 2 from the pipeline C1.

Figure 9:
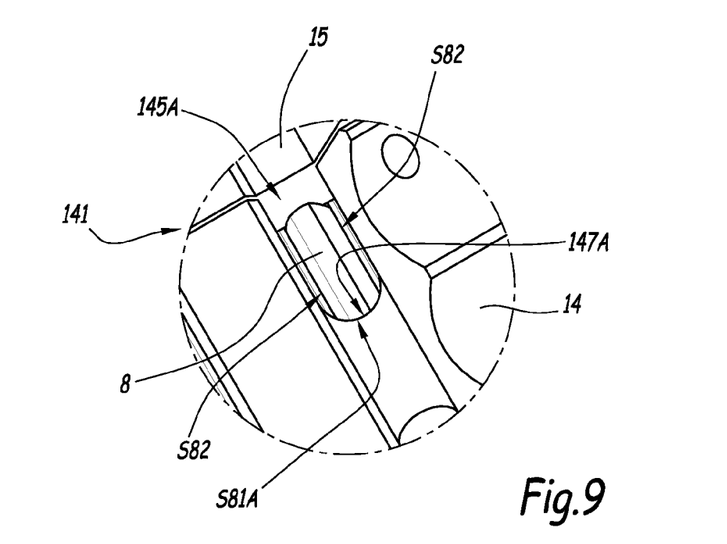
FIG. 9 is an enlarged perspective view in the direction of arrow F9 in FIG. 8.
Figure 10:
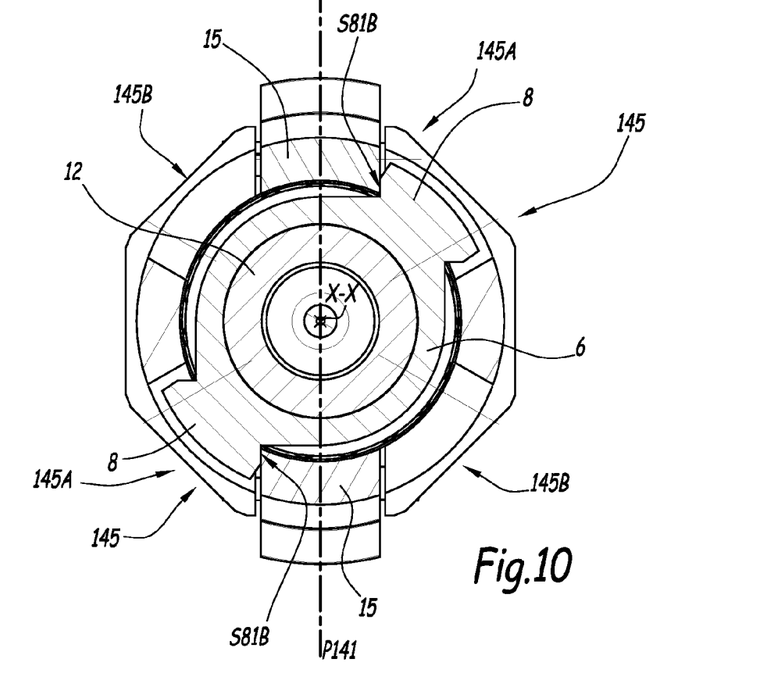
FIG. 10 is a cross-section similar to FIG. 8 of the coupling in the uncoupled configuration.
Figure 11:
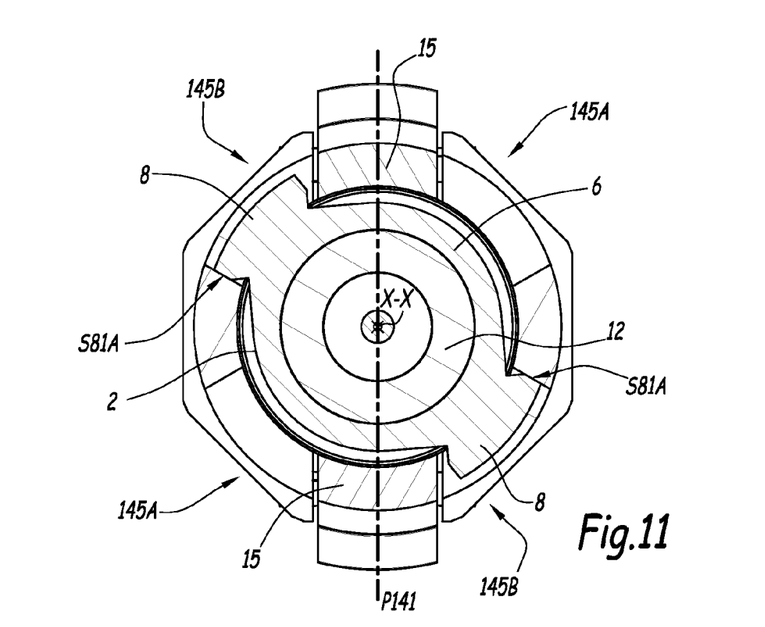
FIG. 11 is a cross-section similar to FIG. 8 showing the unscrewing of the complementary element from its support.
Figure 12:
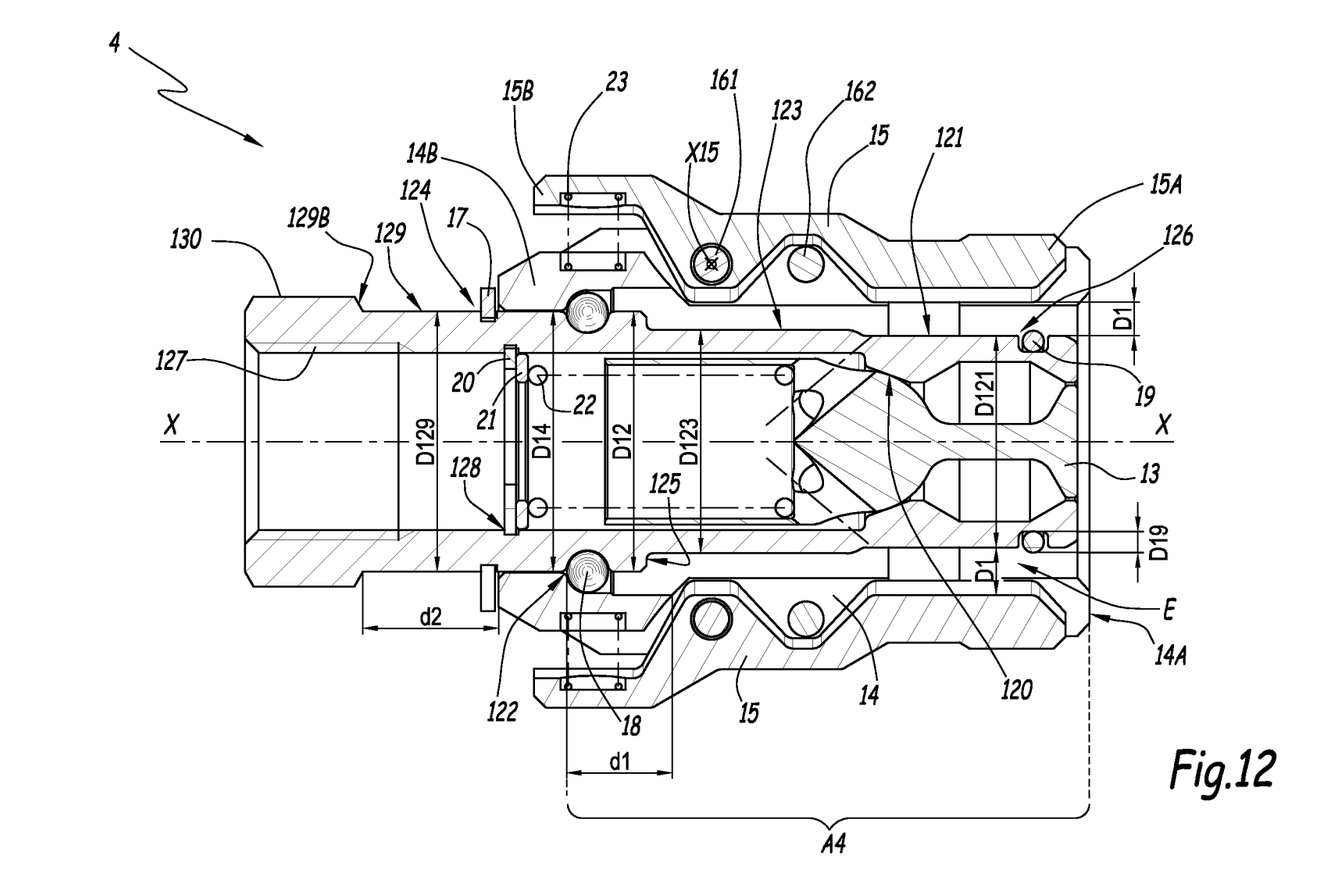
FIG. 12 is an enlarged view of the coupling element of FIG. 1.

When the unscrewing torque is high, in particular for couplings 1 having a channel C with a large diameter, the unscrewing force applied on the levers 15 tends to deteriorate the levers 15. Consequently, it is preferable, before unscrewing the complementary element 2, to uncouple the coupling 1 and recouple it by engaging the pins 8 in the part 145B of the notches 145 opposite that used for screwing the complementary element 2 on the support 100, in order to rotate the body 6 of the complementary element 2 by means of the surface contact between the pins 8 and the bottom 147B of the part 145B of the notches 145, as shown in FIG. 9.

The elements 2 and 4 are locked using the bayonet system and the levers 15, which may be visually checked from the outside, which is advantageous. Furthermore, during locking, when the levers 15 are returned to the locking position at the end of the locking phase, the impact between the levers 15 and the shafts 162 produces a sound allowing the operator to ensure correct locking of the coupling 1.

The coupling 1 comprises a single attached sealing gasket 19, which is positioned on the outer surface of the body 12 of the element 4, outside the fluid flow channel C. The seal 19 is positioned in the annular space E, which is accessible in the uncoupled configuration without assembling the locking ring 14 or the levers 15, which facilitates maintenance while protecting the seal 19 by the locking ring 14 in the uncoupled configuration of the coupler 1. In particular, the seal 19 is formed by a toroid with a radial section, i.e., in a section plane with a radial direction passing through the longitudinal axis X-X, that is circular and the outer diameter D19 of the radial section of the seal 19, corresponding to the maximum radial dimension of the radial section of the seal 19, is smaller than the minimum radial dimension D1 of the portion of the annular space E in front of the seal 19, i.e., axially delimited by the housing 126 and the front face 14A of the ring 14. A sufficient space is thus arranged for the mounting and disassembling of the seal 19 to or from the housing 126. The seal 19 being able to be replaced easily, for example before each coupling, it is possible to consider using an inexpensive traditional seal. For example, in the case of a high temperature fluid, the seal 19 is not necessarily provided to withstand high temperatures, which is less expensive.

The seal 19 produces radial sealing between the bodies 6 and 12, i.e., the seal 19 radially sealably cooperates with the body 6 in the coupled configuration, which guarantees sealing even in case of vibrations.

The locking ring 14 can be mounted from the front of the body 12 of the element 4. Thus, contrary to the coupling according to EP-A-2,141,402, the choice of the diameter of the rear end 12B of the body 12, coupled to the pipeline C2, is independent of the minimum inner diameter of the locking ring 14. It is therefore not necessary to provide an intermediate ring in the case of applications where the pipeline C2 has a large diameter, which makes it possible also to eliminate the presence of additional sealing elements. This limits the risk of leaks for high-temperature applications. The beads 18 are mounted through the slot 141, such that no other development is necessary on the locking ring 14.

The locking ring 14 is assembled simply around the body 12 by the beads 18 and the second metal elastic annulus 17. The disassembly of the locking ring 14, according to the procedure opposite that described for its assembly, is also simple, nondestructive and does not require disassembling the pipeline C2 from the element 4, which makes it possible to clean the outer surface of the body 12 regularly, and in particular the housing 126 of the seal 19.

The double guiding of the bodies 6 and 12 of the elements 2 and 4 makes it possible to limit the mechanical biases of the seal 19 in case of vibrations. In particular, during coupling, the double operation of the stages 62 and 63 with the stages 121 and 123 begins before the contact of the front end 6A of the body 6 of the complementary element 2 with the seal 19. This limits the mechanical forces absorbed by the seal 19, which makes it possible to increase the lifetime of the seal 19 and improve the sealing thereof.

The angular indexing of the elements 2 and 4 is effective before the contact of the pins 8 with the levers 15, which facilitates blind coupling, for example when the entire length of the complementary element 2 is embedded in its support 100. Alternatively, the indexing can be done prior to the engagement of the pins 8 in the slots 141, by cooperation of elements of the body 6 other than the pins 8 with the body 12.

To allow screwing and unscrewing of the complementary element 2 with its support 100, when the complementary element 2 is locked in the element 4, the locking ring 14 can be maneuvered, instead of using a specific tool maneuvering the complementary element 2. This makes it possible to reduce the axial bulk of the complementary element 2, which then does not necessarily have to protrude from the well formed by the support 100.

The rotational guiding of the locking ring 14 is done by the beads 18, which ensure good guiding precision. During the rotation of the ring 14 for locking or unlocking, screwing or unscrewing, the pipeline C2 is not torsionally biased.

The double guiding of the bodies 6 and 12 of the elements 2 and 4 in the locked position of the coupling 1 ensures precise rotational driving of the body 6 of the complementary element 2, which makes it possible to screw or unscrew the complementary element 2 without jamming and without damaging the seal 19.

The structure of the coupling 1, with two slots 141 and two diametrically opposite pins 8, makes it possible to optimize the geometry of the surfaces in contact during the screwing and unscrewing operations.

Alternatively, the pins 8 can be distributed around the axis X-X with an angle α different from 180°. Furthermore, the pins 8 can have different widths. The slots 141 then also have different widths L141 to adapt to the width L8 of each pin 8. These alternatives allow mistake-proofing, which is advantageous to avoid confusing the circuits if several type 1 couplings are used nearby.

The parts S81A and S81B not parallel to the side surfaces S81 of the pins make it possible to optimize the contacts depending on whether the pins 8 abut at the bottom of the notch 147A, 147B or against the lever 15. The surfaces S81A and S81B are arranged on each side surface S81 to optimize the contacts depending on whether the pins 8 are placed in one or the other of the parts 145A or 145B of the notches 145.

In the coupled configuration, the axial surface contacts between the rear surfaces S82 of the pins 8 and the notches 145, as well as the surface contacts between the first surfaces S81A of the pins 8 and bottom walls 147A and 147B and the surface contacts between the second surfaces S81B of the pins 8 and the levers 15, have an extensive surface area. Thus, the bayonet locking is very robust, in particular when the coupling 1 undergoes vibrations.

The planar face 132 of the valve 13 is flush in the longitudinal direction with the front face of the front end 12A of the body 12 in the uncoupled configuration of the coupling 1, to limit the risks of pollution.

Figure 13:
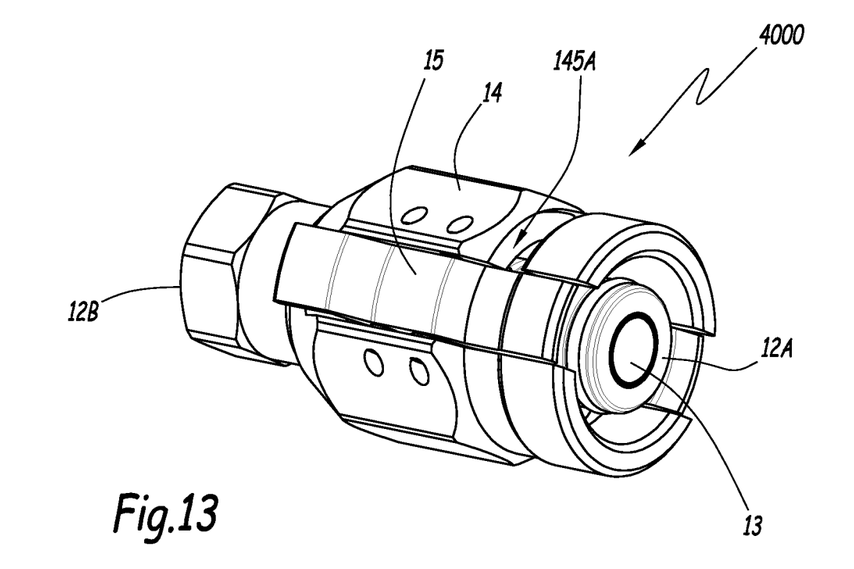
FIG. 13 is a perspective view of a coupling element according to an alternative of the invention.
Figure 14:
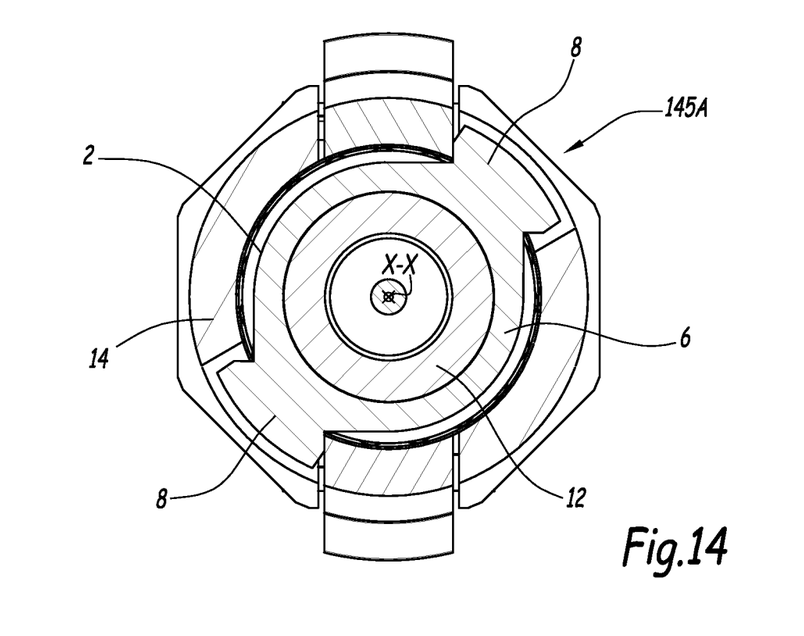
FIG. 14 is a cross-section similar to FIG. 8 of the coupling element of FIG. 13.

FIGS. 13 and 14 show a coupling element 4000 according to one alternative of the invention, in which the notches 145 each comprise a single part 145A extending on a single side of the corresponding slot 141. In that case, the locking of the ring 14 is possible owing to a rotation of the ring 14 in only one direction, corresponding to the entry direction of the pins 8 in the notches 145A.

In another alternative of the invention, not shown, the beads 18 are replaced by other securing elements such as rollers or by simple obstacles such as lugs mounted in the housings distributed around the axis X-X. In the latter case, the locking ring 14 may not be rotatable relative to the body 12.

In the embodiments shown in the figures, the rotation of the locking ring 14 relative to the body 12 makes it possible, during locking and unlocking, not to bias the pipeline C2 in torsion when the latter is connected to the element 4 before locking or unlocking.

When the locking ring 14 is not movable around the body 12, the levers 15 can be mounted articulated in rotation on the body 12 in the slot 141.

In another alternative of the invention, the orientation of the notches 145 is oblique relative to the longitudinal axis X-X and comprises both an axial component and a circumferential component. When the axial component is oriented forward in the direction of progression of the pins 8 in the notches 145, the axial bulk of the coupling 1 is increased and an over-travel of the complementary element 2 in the element 4 is necessary for the coupling. When the axial component is oriented toward the rear, the locking forces absorbed by the levers 15 are accentuated.

The threads 64 and 127 for connecting the bodies 6 and 12 of the elements 2 and 4 to the pipelines C1 and C2 are internal, but alternatively may be external.

The pins 8 can be replaced by parts with different geometries protruding radially relative to the body 6 of the complementary element 2.

In another alternative not shown, only the element 4 or the complementary element 2 is equipped with a valve 13 or 17.

In the context of the invention, the different alternatives described may be combined with each other, at least in part. For example, it is possible to provide a locking ring 14 comprising notches 145 that only comprise a single part 145A or 145B, in combination with a notch 145 oriented obliquely.

The invention claimed is:

1. A coupling for the connection of pipelines, comprising a coupling element and a complementary coupling element that fit into one another along a longitudinal axis, the coupling element comprising:
    a first body,
    a locking ring mounted around the first body,
    securing means, including at least one axial stop and a securing element,
    cooperating with a rear part of the locking ring, for securing the first body in translation with the locking ring,
    the locking ring comprising:
        a slot for receiving a protruding part, radially protruding from a second body of the complementary coupling element,
        a locking notch in which the protruding part can be axially locked along the longitudinal axis relative to the first body,
    wherein the coupling element includes a lever radially rotated in the slot between a locking position in which the lever locks the protruding part in the locking notch and a released position in which the lever allows the protruding part to pass between the locking notch and the slot, wherein a spring urges the lever toward the locking position, wherein the coupling element has a sealing gasket mounted on an outer surface of the first body and wherein the sealing gasket cooperates radially with the second body in a coupled configuration of the coupling element and the complementary coupling element.

2. The coupling according to claim 1, wherein the coupling element includes a valve mounted within the first body and elastically urged toward a seat formed in the body of the coupling element, wherein the complementary coupling element includes a valve mounted within the second body and elastically urged toward a seat formed in the body of the complementary coupling element and wherein, in an uncoupled configuration of the coupling element and the complementary coupling element, each valve is in direct sealed contact with a corresponding seat.

3. The coupling according to claim 1, wherein the sealing gasket is arranged in an annular space, radially delimited between the first body and the locking ring, wherein a minimum radial thickness of the annular space in front of the sealing gasket is larger than a maximum radial dimension of the radial section of the sealing gasket.

4. The coupling according to claim 1, wherein over a length of a front part of the coupling element, delimited by the rear part of the locking ring and considered along the longitudinal axis, a maximum outer radial dimension of the first body is smaller than a minimum inner radial dimension of the rear part of the locking ring.

5. The coupling according to claim 4, wherein a rear surface of the first body cooperating with the rear part of the locking ring has a diameter smaller than the minimum inner radial dimension of the rear part of the locking ring and wherein a first distance, measured parallel to the longitudinal axis between the securing element and a bottom wall of the slot, is smaller than a second distance, measured parallel to the longitudinal axis between the rear part of the locking ring and a rear end of the rear surface of the first body.

6. The coupling according to claim 4, wherein the securing element includes a crown of beads positioned in an outer slot of the first body and radially covered by the locking ring.

7. The coupling according to claim 1, wherein the outer surface of the first body includes two outer stages each having a diameter, which diameters increase along the longitudinal axis, in a direction going from a front end toward a rear end of the first body, wherein the inner surface of the second body includes two inner stages respectively complementary to the two outer stages and wherein the two outer stages cooperate with the two inner stages in the coupled configuration of the coupling element and the complementary coupling element.

8. The coupling according to claim 7, wherein during coupling of the of the coupling element and the complementary coupling element, the two outer stages cooperate with the two inner stages before the sealing gasket cooperates radially to seal with the second body.

9. The coupling according to claim 1, including pins and corresponding slots that enable to position the locking ring and the second body relative to one another around a longitudinal axis in an indexed configuration which, during coupling of the coupling element and the complementary coupling element, takes place before contact between the protruding part and the lever.

10. The coupling according to claim 1, wherein when the protruding part is locked in the locking notch, a lateral surface of the protruding part contacts with a bottom wall of the locking notch.

11. The coupling according to claim 1, wherein when the protruding part is locked in the locking notch, a side surface of the protruding part is in surface contact with the lever and wherein normal to the surface contact between the side surface of the protruding part, and the lever is oriented in a direction parallel to the axis of rotation of the lever.

12. The coupling according to claim 1, wherein when the protruding part is locked in the locking notch, a rear end of the protruding part is in surface contact with a front edge of the locking notch.

13. The coupling according to claim 1, wherein the locking notch extends in a circumferential direction relative to the longitudinal axis.

14. The coupling according to claim 1, wherein each slot is oriented along the longitudinal axis, and wherein for each slot, the locking notch includes a first part and a second part extending on either side of the slot, the protruding element being able to be received in the first or second part of the locking notch.

15. The coupling according to claim 1, wherein an outer surface of the locking ring is provided with a tool cavity arranged around a longitudinal axis.

16. The coupling according to claim 1, wherein the securing element is a bead.

17. The coupling according to claim 15, wherein the tool cavity has six faces.

18. The coupling according to claim 1, wherein one of the coupling element and the complementary coupling element includes a valve which is mounted within the body of the one of the coupling element and the complementary coupling element and wherein the valve is elastically urged toward a seat formed in the body receiving the valve and wherein, in the uncoupled configuration of the coupling element and the complementary coupling element, the valve is in direct sealed contact with the seat.

* * * * *